(12) United States Patent
Maier et al.

(10) Patent No.: US 7,438,170 B2
(45) Date of Patent: Oct. 21, 2008

(54) CLUTCH RELEASE ARRANGEMENT

(75) Inventors: Markus Maier, Cadolzburg (DE); Bernhard Klopfer, Bad Windsheim (DE); Ludwig Winkelmann, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 343 days.

(21) Appl. No.: 11/315,658

(22) Filed: Dec. 22, 2005

(65) Prior Publication Data

US 2006/0169568 A1 Aug. 3, 2006

(30) Foreign Application Priority Data

Dec. 22, 2004 (DE) .................. 10 2004 061 679

(51) Int. Cl.
*F16D 19/00* (2006.01)
*F16D 11/00* (2006.01)
(52) U.S. Cl. ............... 192/98; 192/99 S; 192/110 R
(58) Field of Classification Search ............. 192/99 S, 192/98, 110 R, 110 B
See application file for complete search history.

(56) References Cited

U.S. PATENT DOCUMENTS

| | | | |
|---|---|---|---|
| 3,277,988 A | 10/1966 | Pitner | |
| 4,267,913 A * | 5/1981 | Ernst et al. .................. 192/98 |
| 4,498,566 A | 2/1985 | Renaud | |
| 4,601,377 A * | 7/1986 | Flotow et al. ........... 192/110 R |
| 4,629,049 A | 12/1986 | Lassiaz | |
| 4,667,799 A * | 5/1987 | Kummer ................ 192/70.251 |
| 4,903,808 A * | 2/1990 | Okubo et al. .................. 192/98 |
| 4,947,976 A * | 8/1990 | Limbacher .................... 192/98 |
| 5,273,146 A | 12/1993 | Nakamura et al. | |
| 5,979,632 A | 11/1999 | Grosspietsch et al. | |
| 6,585,772 B2 * | 7/2003 | Hunter et al. ............. 623/23.54 |

FOREIGN PATENT DOCUMENTS

| | | |
|---|---|---|
| DE | 14 75 418 | 10/1939 |
| DE | 76 00 543 | 5/1976 |
| DE | 28 30 249 | 1/1979 |
| DE | 3218325 | 12/1982 |
| DE | 3810369 | 10/1989 |
| DE | 197 44 821 | 4/1999 |
| EP | 0908640 | 4/1999 |
| FR | 2 304 826 | 10/1976 |
| JP | 09014291 | 1/1997 |

* cited by examiner

*Primary Examiner*—Roger Pang
(74) *Attorney, Agent, or Firm*—Volpe and Koenig, P.C.

(57) ABSTRACT

A clutch release arrangement (1) for a clutch release (pressure plate) (6) used in vehicles is provided. The clutch release arrangement (1) includes a control lever (2), which forms one unit together with a housing (3) and also a clutch release bearing (4). The housing (3) is supported directly on the control lever (2) by contact surfaces (8a, 8b or 18a, 18b) of different lengths, which allow height compensation "s" at assembly.

25 Claims, 5 Drawing Sheets

CLUTCH RELEASE ARRANGEMENT

FIELD OF THE INVENTION

The invention relates to a clutch release arrangement used in vehicles with manual transmissions. The clutch release arrangement comprises a hollow cylindrical housing, which surrounds a drive shaft at a distance and which can be displaced axially when the clutch release arrangement is actuated. On the side directed towards the release coupling, the housing is connected to a clutch release bearing. On the side opposite the clutch release bearing, the housing is in active connection with a control lever, wherein the housing is connected to the control lever using a positive fit with play.

BACKGROUND

The housing of the clutch release arrangement takes over the function of a carrier part or a transfer element, which separates a transmission of forces between the internal combustion engine and the transmission when the clutch release arrangement is actuated in connection with the control lever and the clutch release bearing acts on the clutch release (pressure plate) allowing clutch uncoupling which thus enables the gear of the transmission to be changed. To simplify the assembly of the clutch release arrangement, concepts are known, in which the clutch release bearing can be premanufactured captively with the housing.

From DE 76 00 543 U1, such a device is known. This clutch release arrangement comprises a clutch release bearing, whose inner ring is provided with a flange that extends radially outwards, whereby the inner ring of the clutch release bearing engages locked in rotation in a control lever shaped as a clutch fork. For the connection of the clutch fork to the extended flange section of the inner ring, separate, additional retaining elements are used. This known measure shortens the assembly times and enables automated assembly as much as possible.

The clutch release arrangement according to DE 28 30 249 A1 comprises a clutch release bearing, which includes a retaining sheet and also a spring plate in connection with outer attachment means for captive arrangement on the housing. For this purpose, the spring plate features a bracket, in whose recess a hook of the washer catches. A disadvantage is that the retaining element directly surrounds the annular flange of the housing, so that there is the risk of twisting for different temperature expansion coefficients between the directly interacting components.

FR 2 304 826 A1 also discloses a shifter device with an axially displaceable housing, which connects to a clutch release bearing. For captive arrangement of the clutch release bearing, the annular flange of the housing is surrounded by a sleeve, which, on one side, extends axially over the clutch release bearing and which positions the clutch release bearing by means of a radially inner rim.

SUMMARY

The invention is based on the objective of creating a premanufacturable clutch release arrangement, which enables various installation heights without additional parts for use in different transmissions.

To address this objective, for a clutch release arrangement of the type noted above, according to the invention the control lever forms a receptacle, in which the housing is locked in a non-rotatable in at least two different installation positions. The different installation positions enable different overall heights, i.e., height compensation for the clutch release arrangement. For this purpose, the housing features two contact surfaces arranged in pairs and offset by 90° for each installation position. The housing can be supported on the control lever by means of these contact surfaces. The clutch release arrangement according to the invention can be used for different vehicles while maintaining the same components, housing, and control lever. Advantageously, the height compensation of the clutch release arrangement according to the invention enables the installation of a structurally equivalent device in vehicles with different transmission and/or engine configurations.

The height compensation can be realized, for example, such that the length of the different contact surfaces is adapted to the installation situation of at least two transmission variants, with which an engine of the vehicle can be combined. In comparison with previous solutions, an economical advantage appears, because the control lever and housing can be used for different structural sizes of transmissions or engines. For automobile manufacturers, a desired reduction in the number of components results due to the invention, because clutch release arrangements identical in construction can be used for different drive concepts, i.e., different arrangements of transmissions with internal combustion engines. The decrease in different parts reduces the logistics expense, simplifies inventory, and creates a cost advantage.

Advantageous configurations of the invention are further described below and in the claims.

A preferred configuration of the invention comprises a clutch release arrangement, whose housing includes contact surfaces, which correspond to each installation position and which interact with the control lever in the installed state. Here, the contact surfaces are provided as axial projections, which enable unimpaired adjustment movements of the control lever relative to the housing when the clutch release arrangement is activated. The desired different overall heights of the clutch release arrangement are realized according to the invention by inserting the housing rotated by 90° into the control lever.

A preferred configuration of the invention includes a housing with crowned projections on the contact surfaces. The projections, also designated as Ballus, form a contact zone that engages with associated counter surfaces of the control lever. Alternatively, the invention also includes straight projections of the housing on the front on the contact surfaces, which interact with the control lever.

Preferably, the housing is manufactured from plastic, for which, in particular, a fiberglass-reinforced plastic is suitable. The construction of the housing here includes integral contact surfaces, so that the housing can be manufactured cost-effectively in one manufacturing process, an injection-molding method.

Furthermore, to achieve a high-strength shape of the contact surfaces, which is optimized in terms of wear, preferably the housing is provided with reinforcement. For this purpose, a sleeve-shaped reinforcement, which surrounds the outer surface of the housing and which simultaneously comprises the contact surfaces including the axial projections, is preferred. Here, a captive arrangement of the reinforcement can be produced, for example, by means of a snap-on connection, for which a projecting bump of the housing snaps into a corresponding recess of the reinforcement in the installation position.

The invention also includes, if necessary, the coating of the projections of the contact surfaces of the housing and/or the counter surfaces of the control lever in the region of the contact zone. For this purpose, it is preferred that a wear-reducing and/or friction-reducing coating is provided in order to reduce the wear in the region of the contact surface between the housing and the control lever. This measure, which simultaneously prevents the generation of noise, advantageously increases the service life of the clutch release arrangement.

Furthermore, the invention includes the manufacture of the reinforcement as a multi-component layer directly together with the production of the housing in a multi-component injection molding method, so that a positive and/or non-positive fit for both components is guaranteed.

To achieve a rotationally fixed arrangement of the housing relative to the control lever, which is necessary for the functioning of the clutch release arrangement, the housing features flat sections on the outer surface. The flat sections, which are arranged parallel to each other, engage in a receptacle of the control lever corresponding to the outer surface of the housing in a positive fit and with play in the installation position. This arrangement enables unimpaired angle-limited adjustment movement of the control lever relative to the housing when the clutch release arrangement is actuated.

Furthermore, according to the invention, the housing can include two contact surfaces, which are arranged in pairs and offset by 90° and whose flat sections correspond to different wrench widths.

In one advantageous configuration of the housing, the housing is provided with two different wrench widths in the region of the outer surface. This construction simplifies position-oriented allocation during assembly of the housing in the control lever, in which each wrench width corresponds to a defined installation position, i.e., alignment of the housing relative to the control lever. The different wrench widths guarantee, in particular, automated, process-safe assembly of the clutch release arrangement.

As a supplemental or alternative measure for preventing incorrect assembly between the housing and the control lever, according to the invention a visual display is provided. For this purpose, advantageously a color identifier is provided between the housing and the control lever for each installation situation. Therefore, after successful assembly, the installation can be inspected by means of visual inspection. On the other hand, differently colored identifiers of the corresponding contact surfaces simplifies, for example, assembly via a robot, in that this robot inserts the housing according to the color identification in alignment into the receptacle of the control lever through corresponding programming.

As an alternative to a colored identifier, according to the invention, a registered barcode is provided as a visual display in the region of the contact surfaces. The contact surfaces provided with different barcodes enable the robot to allocate the housing relative to the control lever in a position oriented way for automated assembly.

Furthermore, the clutch release arrangement can be provided with a visual display between the housing and the control lever, which becomes visible only after successful completion of the clutch release arrangement. This measure presents itself, for example, for an assembly device, in which the desired overall height is predetermined and in which a color-designated region of the housing becomes visible in a recess of the control lever only after successful assembly.

As another visual display, the invention includes recessed or raised characters, which are preferably arranged in the region of the outer surface of the housing and which become hidden or readable after successful assembly. For this purpose, a rib-like structure, a font, numerals or letters, or a color identifier, is suitable.

Preferably, a rib formed on the housing and forming a visual display features a desired rupture point, which requires only a minimally higher joining force to insert the housing into the corresponding receptacle of the control lever when the housing and the control lever are aligned in terms of position.

To achieve a captive attachment of the housing on the control lever, a snap-on connection is provided. For this purpose, preferably an opening or a notch formed as a retaining cam, which engages with a positive fit into a corresponding groove or recess of the control lever, is suitable.

According to the invention, the clutch release arrangement comprises a housing manufactured from plastic and also a control lever manufactured from sheet metal. Here, the control lever can be manufactured economically without cutting through a deep-drawing method. Furthermore, the invention includes a control lever, which is manufactured from a high-strength plastic, for example, fiberglass-reinforced plastic or Kevlar.

In the invention, all of the components of the clutch release arrangement, the housing, the control lever, and also the clutch release bearing are joined together captively into one unit independent of the allocation of these parts for achieving different overall heights.

BRIEF DESCRIPTION OF THE DRAWINGS

Embodiments of the invention are shown in the drawings, which are described in more detail below. In the drawings.

DETAILED DESCRIPTION OF THE PREFERRED EMBODIMENTS

Figure 1:
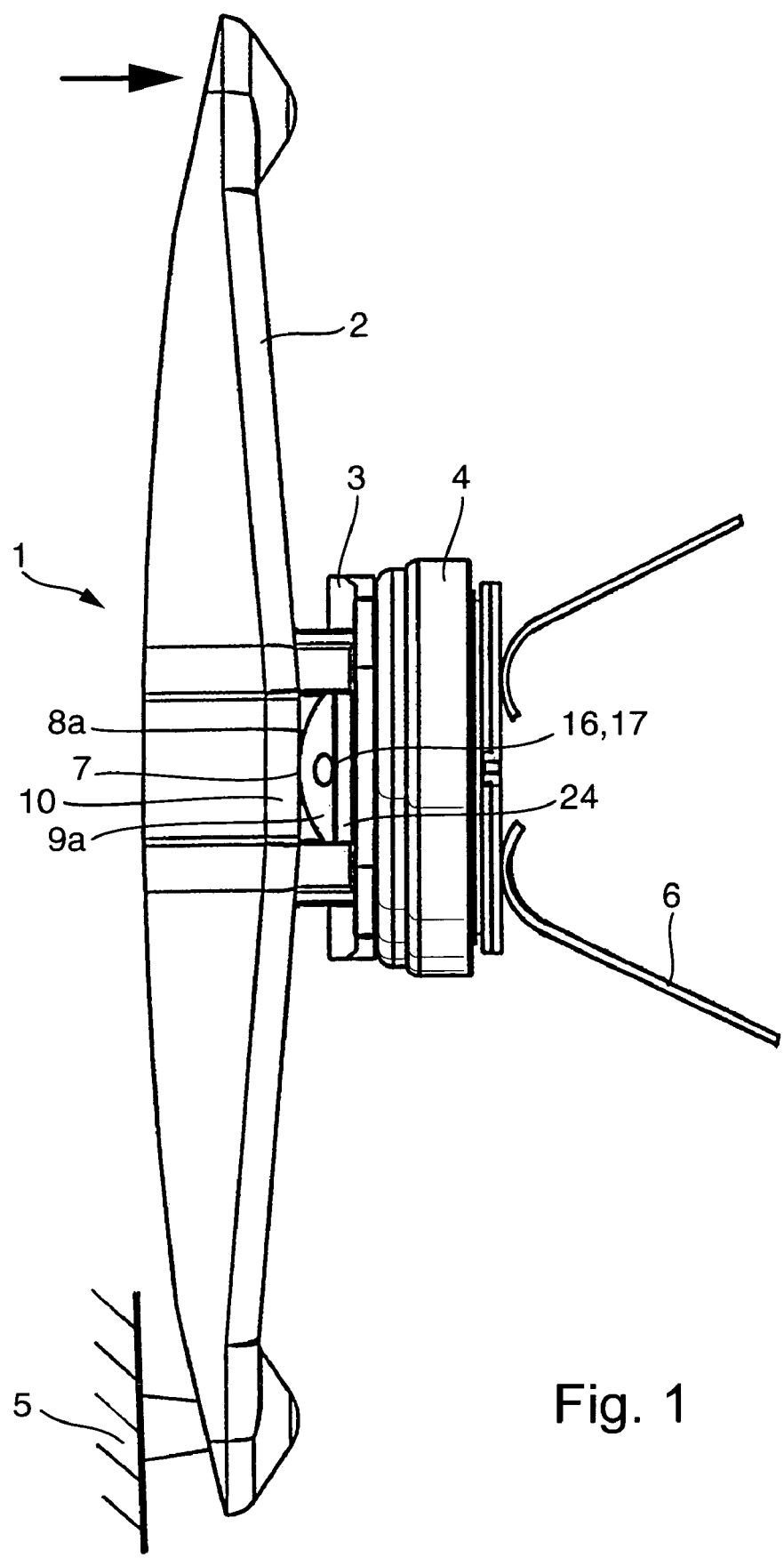
FIG. 1 is a side view of a clutch release arrangement according to the invention.

In FIG. 1, a clutch release arrangement 1 is shown, which comprises a control lever 2, a housing 3, and also a clutch release bearing 4. In the installed state, the control lever 2 is supported with one end on a fixed bearing point 5. To activate a clutch release (pressure plate) 6, of which one plate spring is shown, a force acting in the direction of the arrow is exerted on the other end of the control lever 2, whereby the clutch release bearing 4 also moves axially in a direction of the arrow and in this way interrupts a transmission of forces via the clutch release 6, in order to enable, for example, the gear of the transmission to be shifted. To achieve a torque-free, low-friction, and reduced-wear transmission of forces as much as possible from the pivoting control lever 2 to the axially movable housing 3, between these parts there is a contact zone 7, which is contacted on a line as much as possible. For this purpose, the housing 3 forms two raised contact surfaces 8a, 8b embodied as axial projections 9a, 9b, which have a convex or crowned shape on the end and which contact the control lever 2 at a counter surface 10 that is as straight or flat as possible with a non-positive fit.

Figure 2:
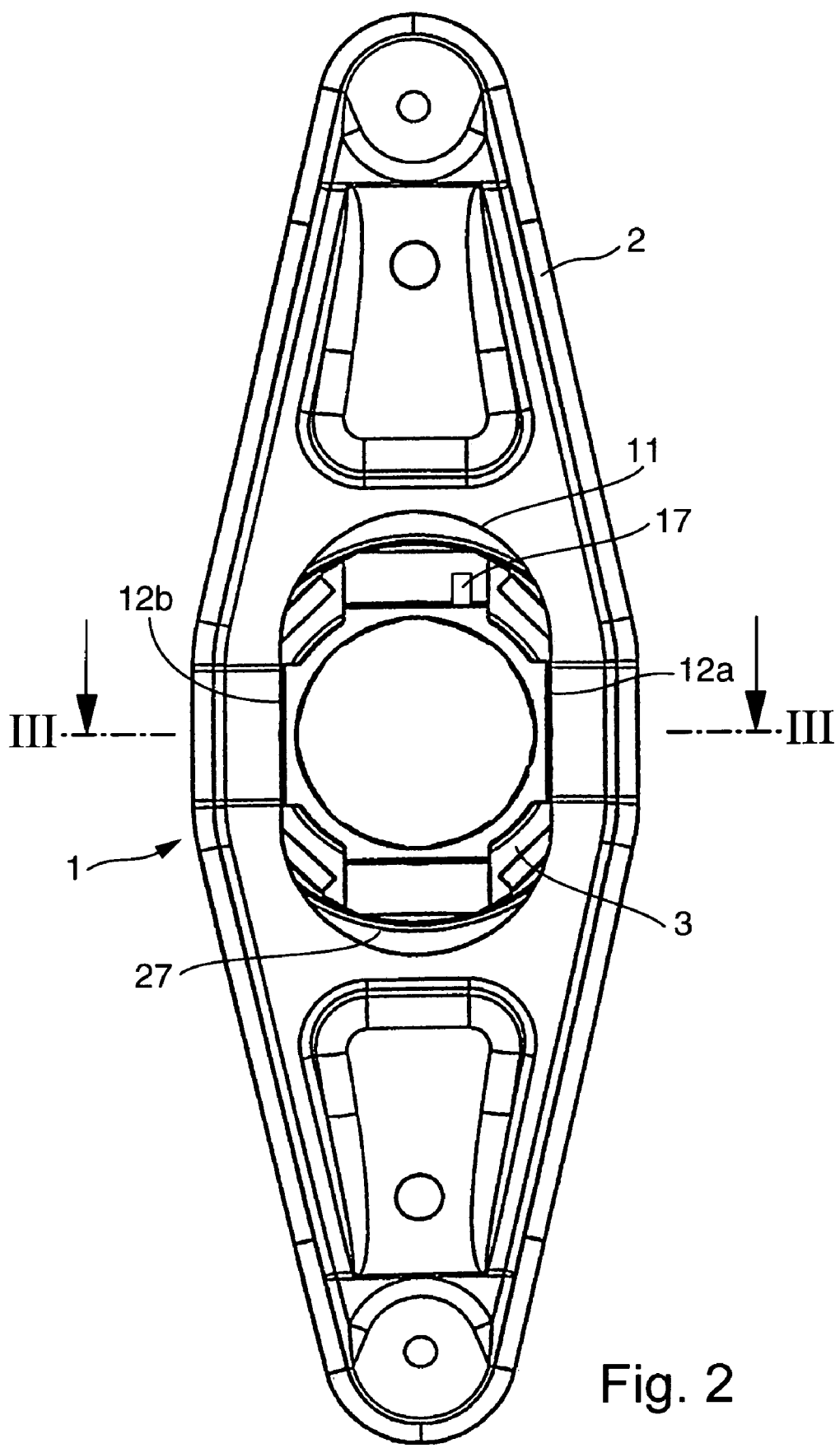
FIG. 2 is a front view of the clutch release arrangement from FIG. 1.

As FIG. 2 makes clear, the housing 3 is inserted with a positive fit into a receptacle 11 of the control lever 2. For this purpose, the housing 3 has two parallel flat sections 12a, 12b, which are inserted into receptacles 11 of the control lever that have a corresponding shape as much as possible. Thus, the housing 3 is fixed with a positive fit and locked in a non-rotatable manner to the control lever 2, with limited displacement of the housing 3 in the longitudinal direction of the control lever 2 being possible simultaneously based on its function.

The components of the clutch release arrangement 1 joined into one unit are connected captively to each other. Here, the housing 3 is joined captively by means of a snap-on connection 13 illustrated in FIGS. 3 and 4. The snap-on connection 13 comprises at least one retaining cam 14, which, as shown in FIG. 4, engages behind a wall 15 of the control lever 2 in the installed position.

The installed position of the housing 3 relative to the control lever 2 is checked by means of a visual display 16 shown in FIG. 1. A correct installed position is reached as soon as an identifier 17 formed on the projection 9a becomes visible and is not covered by a bar 24 of the control lever 2.

Figure 3:
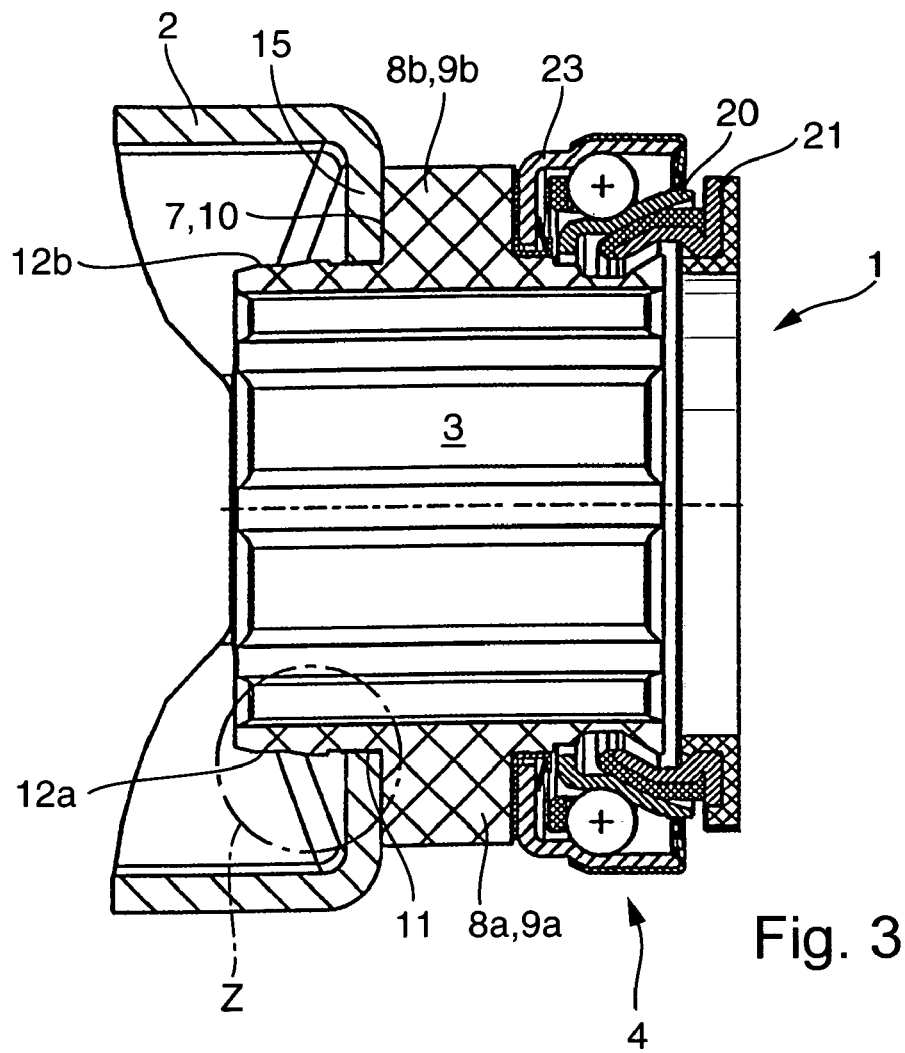
FIG. 3 is a cross-sectional view of the clutch release arrangement taken along the line 3-3 from FIG. 2.
Figure 4:
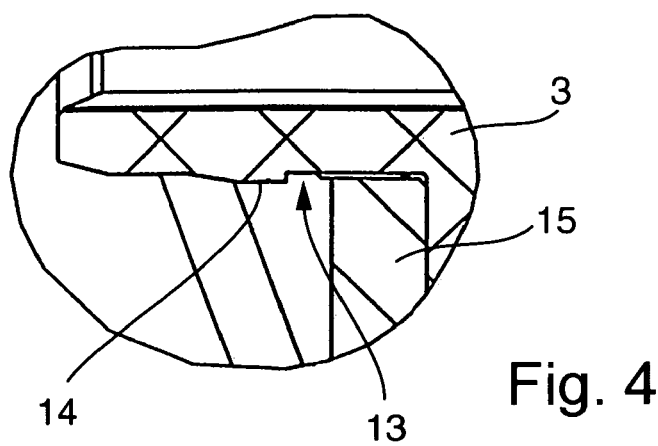
FIG. 4 is an enlarged scale view of the detail "Z" from FIG. 3.

FIG. 3 makes clear the construction of the housing 3, which is used simultaneously as the carrier part for the clutch release bearing 4. An outer bearing ring 23 of the clutch release bearing 4 is locked in rotation to the housing 3. An adjustment ring 21, which contacts on one end to a plate spring of the clutch release 6, is supported on another inner bearing ring 20 of the clutch release bearing 4.

Figure 5:
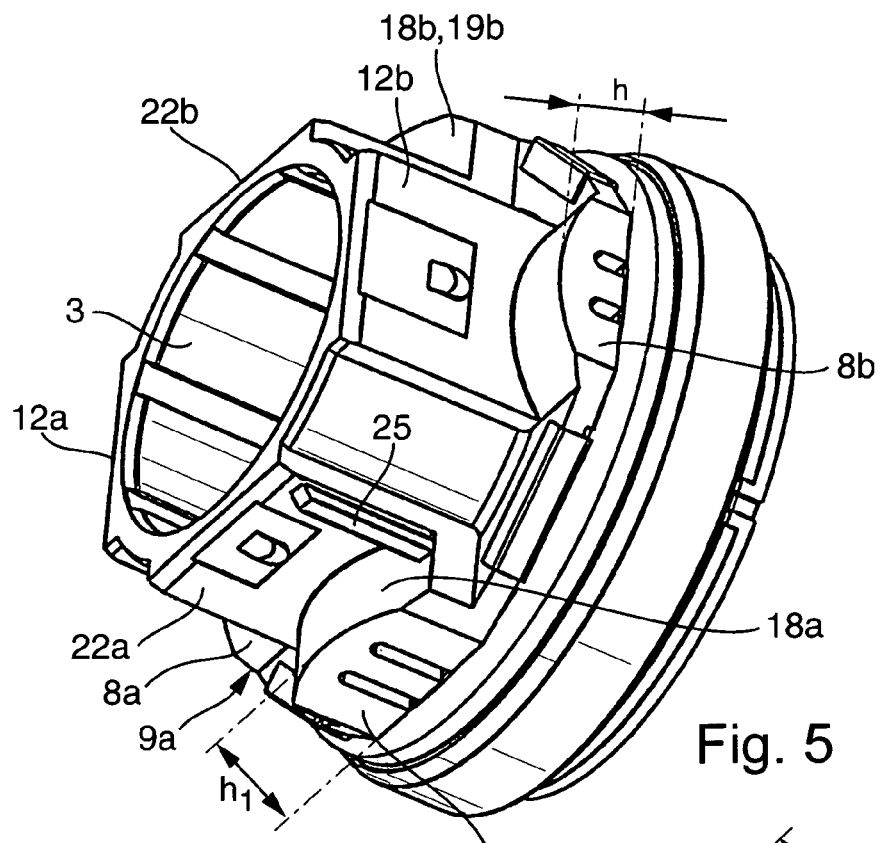
FIG. 5 is a perspective view of a housing of the clutch release bearing of the clutch release arrangement according to the invention.
Figure 6:
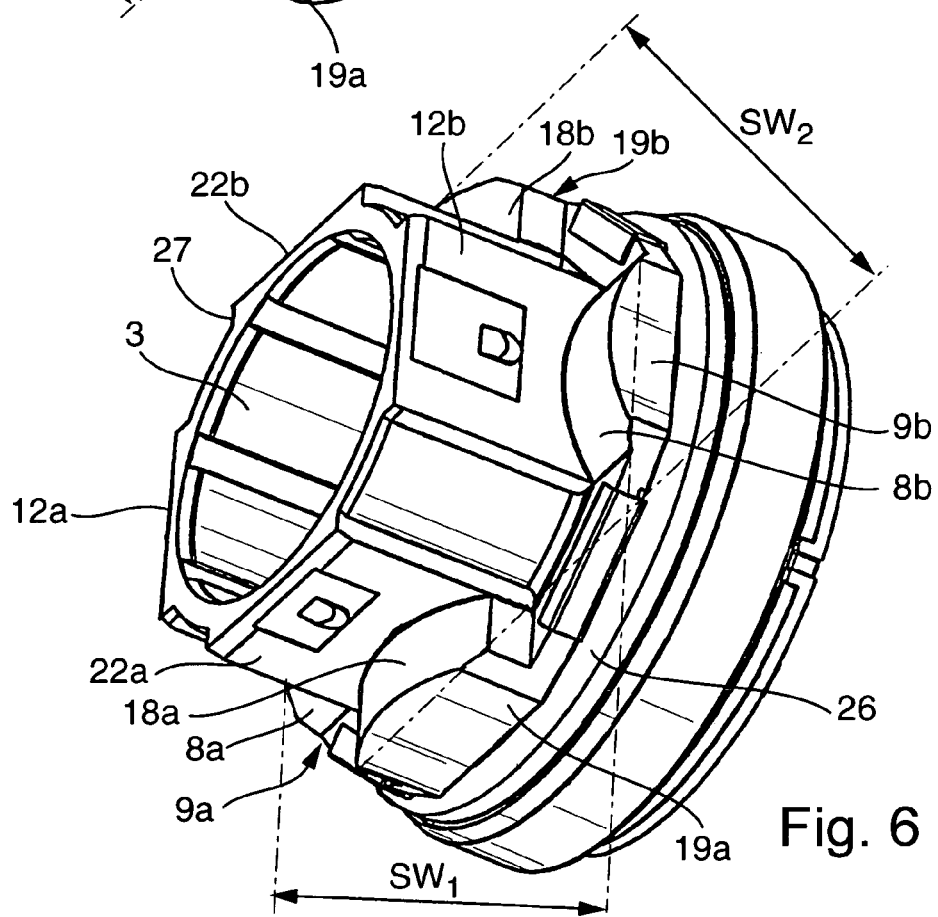
FIG. 6 is a view of a housing with an alternative configuration to FIG. 5 in connection with a clutch release bearing.

FIGS. 5 and 6 show the housing 3 in connection with the clutch release bearing 4 in a perspective view. These illustrations make clear, in particular, the structurally different contact zones 7 according to the invention designated with "h" and "$h_1$" respectively on the housing 3 relative to the control lever 2 for achieving height compensation "S" according to FIG. 7. For this purpose, the housing 3 comprises four contact surfaces 8a, 8b; 18a, 18b. The advantage of using one lever for two different applications is guaranteed by two wrench widths $SW_1$ and $SW_2$. The axial projections 19a, 19b of the contact surfaces 18a, 18b surpass the length of the other axial projections 9a, 9b of the contact surfaces 8a, 8b. By rotating the housing 3 by 90° relative to the control lever 2, different overall heights of the clutch release arrangement 1 are set, whereby height compensation "S" according to FIG. 7 can be achieved. The clutch release arrangement 1 can be used with an identical scope of components for different transmissions and/or internal combustion engines.

The contact surfaces 8a, 8b; 18a, 18b formed directly on the housing 3 made from plastic in connection with the associated axial projections 9a, 9b; 19a, 19b guarantee a different overall height or enable height compensation "S". In the region of the flat section 22a, the housing 3 from FIG. 5 features a matching rib 25, which is used, in particular, to prevent incorrect assembly of the housing 3. This matching rib 25 prevents, on one hand, incorrect allocation of the housing 3 in the control lever 2, for manual assembly. On the other hand, the matching rib 25 features a desired rupture point, which breaks away after application of a higher press-in force and thus enables unimpaired installation of the housing 3 in both positions.

In contrast to FIG. 5, the housing 3 from FIG. 6 features reinforcement 26, which has an annular shape as much as possible, and which includes all of the contact surfaces 8a, 8b; 18a, 18b as a separate component. On the inside, the reinforcement 26 is adapted to the contours of the outer surface 27 of the housing 3 and thus connected with a positive fit and locked non-rotatably to the housing 3. The reinforcement 26 exhibiting higher strength relative to the plastic of the housing 3 reduces or prevents wear in the region of the contact zone 7 between the housing 3 and the control lever 2. Advantageously, the reinforcement 26 features different wrench widths in the region of the contact surfaces 8a, 8b; 18a, 18b, through which automated assembly is simplified. Thus, the housing 3 can always be held by a tool of the same wrench width and can be joined together with the control lever 2, whereby incorrect assembly is prevented. For this purpose, it has presented itself to form the wrench width "$sw_1$" set between the contact surfaces 8a, 8b which is larger than the other wrench width "$sw_2$" set between the contact surfaces 18a, 18b.

Figure 7:
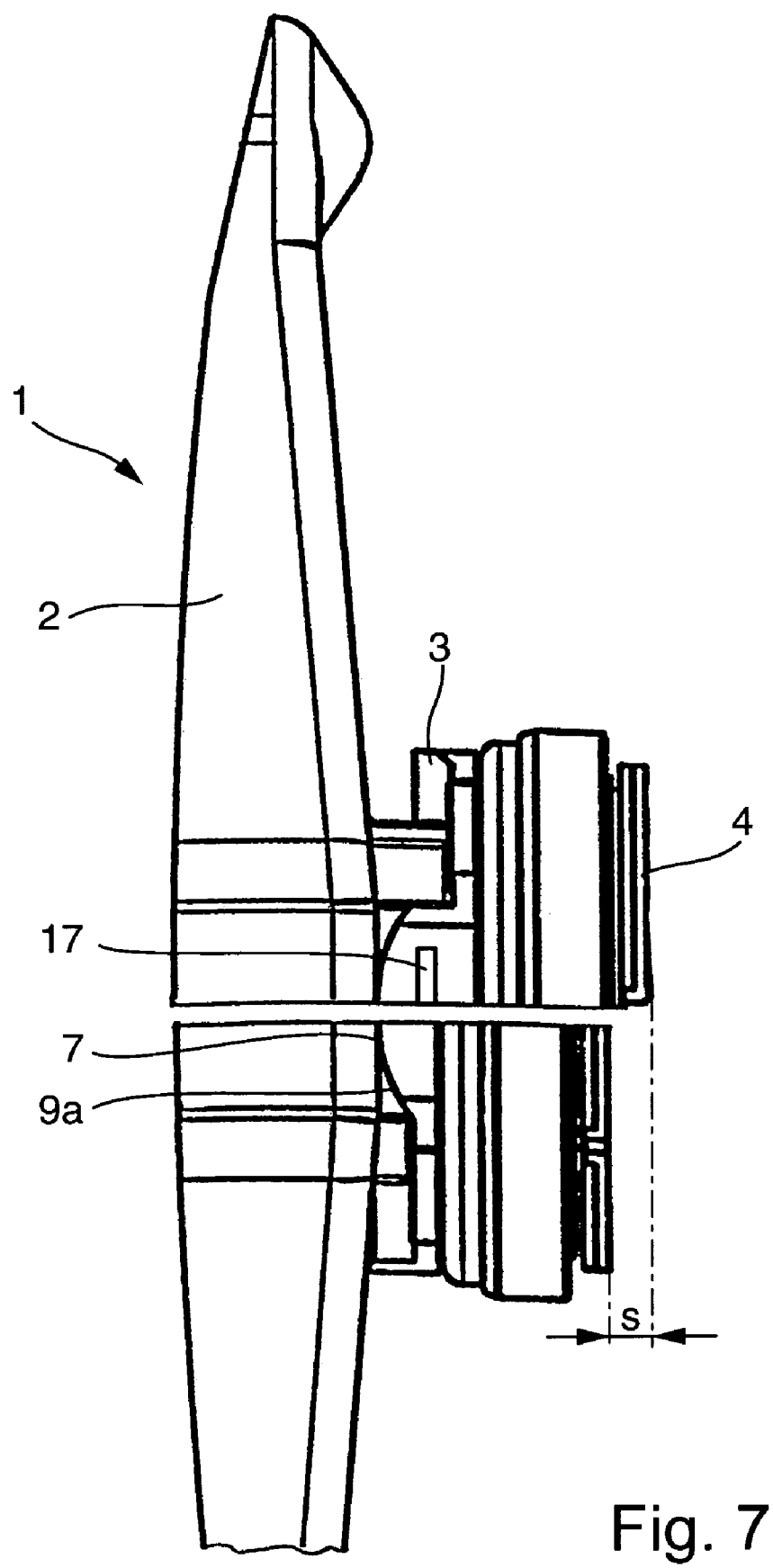
FIG. 7 is a view of the clutch release arrangement from FIG. 1, which makes clear the height compensation.

FIG. 7 shows the possible height compensation "S" set through the different allocation of the housing 3 relative to the control lever 2. This height compensation "S" can be realized, in that the housing 3 is inserted rotated by 90° relative to the control lever 2.

REFERENCE NUMBERS

1 Clutch release arrangement
2 Control lever
3 Housing
4 Clutch release bearing
5 Bearing point
6 Clutch Release (Pressure Plate)
7 Contact zone
8a Contact surface
8b Contact surface
9a Projection
9b Projection
10 Counter surface
11 Receptacle
12a Flat section
12b Flat section
13 Snap-on connection
14 Retaining cam
15 Wall
16 Visual display
17 Identifier
18a Contact surface
18b Contact surface
19a Projection
19b Projection
20 Bearing ring (inner)
21 Adjustment ring
22a Flat section
22b Flat section
23 Bearing ring (outer)
24 Bar
25 Matching rib
26 Reinforcement
27 Outer surface

The invention claimed is:

1. Clutch release arrangement for a clutch release (6) used in vehicles, comprising a hollow cylindrical and axially displaceable housing (3), which surrounds and is spaced apart from a drive shaft and which contacts a control lever (2) via contact surfaces (8a, 8b; 18a, 18b) and is mounted on the control lever (2) with a positive fit and with play, the housing (3) includes a clutch release bearing (4) on an end facing away from the control lever (2) and wrench engaging portions with two different wrench widths "$sw_1$", "$sw_2$" in a region of an outer surface (27) which are defined for receiving tools, the control lever (2) forms a receptacle (11), in which the housing (3) can be fixed in at least two different installation positions, which provide a different overall height resulting in a height compensation "s" defined by the at least two different installation positions for the clutch release arrangement (1), and the contact surfaces (8*a*, 8*b*; 18*a*, 18*b*) are arranged in pairs and offset by 90° on the housing to provide the two installation positions, by which the housing (3) is supported on the control lever (2).

2. Clutch release arrangement according to claim 1, wherein the contact surfaces (8*a*, 8*b*; 18*a*, 18*b*) are formed as axial projections (9*a*, 9*b*; 19*a*, 19*b*) on the housing which interact with the control lever (2).

3. Clutch release arrangement according to claim 1, wherein the housing (3) includes convex or crowned shaped projections (9*a*, 9*b*; 19*a*, 19*b*) on the contact surfaces (8*a*, 8*b*; 18*a*, 18*b*), which form contact zones (7) that contact a counter surface (10) of the control lever (2).

4. Clutch release arrangement according to claim 1, wherein the housing (3) includes projections (9*a*, 9*b*; 19*a*, 19*b*) on the contact surfaces (8*a*, 8*b*; 18*a*, 18*b*) which are formed flat or straight.

5. Clutch release arrangement according to claim 1, wherein all of the contact surfaces (8*a*, 8*b*; 18*a*, 18*b*) are formed on a reinforcement (26) that is a separate component located on the housing (3).

6. Clutch release arrangement according to claim 1, wherein two parallel flat sections (12*a*, 12*b*) are provided on an outer surface (27) of the housing (3) which engage in the receptacle (11) of the control lever (2) with the outer contours of the outer surface (27) being engaged with a positive fit in the installation position.

7. Clutch release arrangement according to claim 1, further comprising a visual display (16) for each of the installation positions of the housing (3) for preventing incorrect assembly.

8. Clutch release arrangement according to claim 7, wherein the visual display (16) comprises a barcode.

9. Clutch release arrangement according to claim 7, wherein the visual display (16) becomes visible in an installed state of the housing (3) after successful completion.

10. Clutch release arrangement according to claim 7, wherein the visual display (16) comprises recessed or raised characters.

11. Clutch release arrangement according to claim 1, wherein a shaped matching rib (25) having a desired rupture point is located on the housing to provide a position-oriented installation of the housing (3).

12. Clutch release arrangement according to claim 1, wherein the housing (3) includes the contact surfaces (8*a*, 8*b*; 18*a*, 18*b*), which are arranged in pairs and offset by 90° and include flat sections (12*a*, 12*b*, 22*a*, 22*b*) which have different wrench widths.

13. Clutch release arrangement according to claim 1, wherein the housing (3) includes the contact surfaces (8*a*, 8*b*; 18*a*, 18*b*) which are arranged in pairs that have different overall heights and are offset by 90° and which have flat sections (12*a*, 12*b*, 22*a*, 22*b*) which have different wrench widths.

14. Clutch release arrangement according to claim 5, wherein at least one of the paired contact surfaces is allocated to the housing (3) as a separate component and connected to the housing with a positive and/or non-positive fit.

15. Clutch release arrangement according to claim 5, wherein the reinforcement (26) is manufactured as a multi-component layer directly during production of the housing by multi-component injection molding and is connected to a base housing part of the housing with a positive and/or non-positive fit.

16. Clutch release arrangement according to claim 1, wherein different ones of the contact points of the housing feature different paired material colorings or have different colors for identification.

17. Clutch release arrangement according to claim 1, wherein the wrench engaging portions are on the contact surfaces (8*a*, 8*b*; 18*a*, 18*b*).

18. Clutch release arrangement according to claim 10, wherein the recessed or raised characters include ribs or fonts.

19. Clutch release arrangement according to claim 5, wherein different ones of the contact points of the reinforcement feature different paired material colorings or have different colors for identification.

20. Clutch release arrangement for a clutch release (6) used in vehicles, comprising a hollow cylindrical and axially displaceable housing (3), which surrounds and is spaced apart from a drive shaft which contacts a control lever (2) via contact surfaces (8*a*, 8*b*; 18*a*, 18*b*) and includes a snap-on connection (13) between the housing (3) and the control lever (2), and is mounted on the control lever (2) with a positive fit and with play, the housing (3) includes a clutch release bearing (4) on an end facing away from the control lever (2), the control lever (2) forms a receptacle (11), in which the housing (3) can be fixed in at least two different installation positions, which provide a different overall height resulting in a height compensation "s" defined by the at least two different installation positions for the clutch release arrangement (1), and the contact surfaces (8*a*, 8*b*; 18*a*, 18*b*) are arranged in pairs and offset by 90° on the housing to provide the two installation positions, by which the housing (3) is supported on the control lever (2).

21. Clutch release arrangement according to claim 20, wherein the housing (3) is made from plastic with integral contact surfaces (8*a*, 8*b*; 18*a*, 18*b*).

22. Clutch release arrangement according to claim 20, wherein the housing includes projections (9*a*, 9*b*; 19*a*, 19*b*) with a wear-reducing and/or friction-reducing coating at least on an end or on the contact surface (8*a*, 8*b*; 18*a*, 18*b*).

23. Clutch release arrangement according to claim 20, wherein the snap-on connection (13) includes openings or notches formed as retaining cams (14), which engage in a corresponding recess with a positive fit or snap onto a wall (15) of the control lever (2).

24. Clutch release arrangement according to claim 20, wherein the control lever (2) is formed from sheet steel, which is produced without cutting through deep-drawing.

25. Clutch release arrangement according to claim 20, wherein all of the components of the clutch release arrangement (1), the housing (3), the control lever (2), and also the clutch release bearing (4) are joined captively into one unit.

* * * * *